US010882640B2

(12) United States Patent
Lui et al.

(10) Patent No.: US 10,882,640 B2
(45) Date of Patent: *Jan. 5, 2021

(54) ENERGY EFFICIENT SATELLITE MANEUVERING

(71) Applicant: The Boeing Company, Chicago, IL (US)

(72) Inventors: Timothy S. Lui, San Pedro, CA (US); Kangsik Lee, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,099

(22) Filed: Sep. 9, 2019

(65) Prior Publication Data
US 2020/0017241 A1  Jan. 16, 2020

Related U.S. Application Data

(63) Continuation of application No. 16/192,411, filed on Nov. 15, 2018, now Pat. No. 10,407,185, which is a
(Continued)

(51) Int. Cl.
*B64G 1/24* (2006.01)
*B64G 1/28* (2006.01)
(Continued)

(52) U.S. Cl.
CPC ............. *B64G 1/242* (2013.01); *B64G 1/244* (2019.05); *B64G 1/26* (2013.01); *B64G 1/283* (2013.01);
(Continued)

(58) Field of Classification Search
CPC .......... B64G 1/242; B64G 1/244; B64G 1/26; B64G 1/283; B64G 1/285; B64G 1/34; B64G 1/36; B64G 1/66; B64G 2001/245
(Continued)

(56) References Cited

U.S. PATENT DOCUMENTS 3,429,526 A   2/1969  Genty
3,558,078 A   1/1971  Lanzaro
(Continued)

FOREIGN PATENT DOCUMENTS

EP   0578176   12/1994
EP   0716365   12/1996
(Continued)

OTHER PUBLICATIONS

European Patent Office, "Extended Search Report," issued in connection with European Patent Application No. 16185325.4, dated Apr. 26, 2017, 8 pages.
(Continued)

*Primary Examiner* — Angelina Shudy
(74) *Attorney, Agent, or Firm* — Hanley, Flight & Zimmerman, LLC

(57) ABSTRACT

Energy efficient satellite maneuvering is described herein. One disclosed example method includes maneuvering a satellite that is in an orbit around a space body so that a principle sensitive axis of the satellite is oriented to an orbit frame plane to reduce gravity gradient torques acting upon the satellite. The orbit frame plane is based on an orbit frame vector.

17 Claims, 10 Drawing Sheets

Related U.S. Application Data continuation of application No. 15/728,281, filed on Oct. 9, 2017, now Pat. No. 10,377,513, which is a continuation of application No. 14/940,811, filed on Nov. 13, 2015, now Pat. No. 10,005,568.

(51) Int. Cl.
*B64G 1/34* (2006.01)
*B64G 1/26* (2006.01)
*B64G 1/36* (2006.01)
*B64G 1/66* (2006.01)

(52) U.S. Cl.
CPC .............. *B64G 1/285* (2013.01); *B64G 1/34* (2013.01); *B64G 1/36* (2013.01); *B64G 1/66* (2013.01); *B64G 2001/245* (2013.01)

(58) Field of Classification Search
USPC .......................................................... 701/13
See application file for complete search history.

(56) References Cited

U.S. PATENT DOCUMENTS

| | | | |
|---|---|---|---|
| 3,767,139 A | 10/1973 | Fischell | |
| 3,866,025 A | 2/1975 | Cavanagh | |
| 4,071,211 A | 1/1978 | Muhlfelder et al. | |
| 4,230,294 A | 10/1980 | Pistiner | |
| 4,230,296 A | 10/1980 | Staley et al. | |
| 4,288,051 A | 9/1981 | Goschel | |
| 4,294,420 A | 10/1981 | Broquet | |
| 4,306,692 A | 12/1981 | Kaplan et al. | |
| 4,567,564 A | 1/1986 | Bittner et al. | |
| 4,617,634 A | 10/1986 | Izumida et al. | |
| 4,728,061 A | 3/1988 | Johnson et al. | |
| 4,757,964 A | 7/1988 | McIntyre | |
| 4,767,084 A | 8/1988 | Chan et al. | |
| 5,067,672 A | 11/1991 | Bouzat | |
| 5,123,617 A | 6/1992 | Linder et al. | |
| 5,149,022 A | 9/1992 | Flament | |
| 5,163,641 A | 11/1992 | Yasaka | |
| 5,248,118 A | 9/1993 | Cohen et al. | |
| 5,279,483 A | 1/1994 | Blancke et al. | |
| 5,312,073 A | 5/1994 | Flament et al. | |
| 5,354,016 A | 10/1994 | Goodzeit et al. | |
| 5,377,936 A | 1/1995 | Mitchell | |
| 5,400,033 A | 3/1995 | Hablani | |
| 5,443,231 A | 8/1995 | Anzel | |
| 5,452,869 A | 9/1995 | Basuthakur et al. | |
| 5,459,669 A | 10/1995 | Adsit et al. | |
| 5,610,820 A | 3/1997 | Shankar et al. | |
| 5,646,847 A | 7/1997 | Ratan et al. | |
| 5,697,582 A | 12/1997 | Surauer et al. | |
| 5,716,029 A | 2/1998 | Spitzer et al. | |
| 5,791,598 A | 8/1998 | Rodden et al. | |
| 5,826,828 A | 10/1998 | Fowell et al. | |
| 5,934,620 A * | 8/1999 | Abernethy | B64G 1/285 244/168 |
| 5,947,421 A | 9/1999 | Beattie et al. | |
| 5,957,410 A | 9/1999 | Bruederle et al. | |
| 5,984,236 A * | 11/1999 | Keitel | B64G 1/283 244/164 |
| 6,017,001 A | 1/2000 | Lambeaux et al. | |
| 6,020,956 A | 2/2000 | Herman et al. | |
| 6,032,903 A * | 3/2000 | Fowell | B64G 1/28 244/165 |
| 6,032,904 A | 3/2000 | Hosick et al. | |
| 6,053,455 A * | 4/2000 | Price | B64G 1/26 244/169 |
| 6,062,512 A * | 5/2000 | Wang | B64G 1/281 244/165 |
| 6,070,833 A | 6/2000 | Burke et al. | |
| 6,102,337 A * | 8/2000 | Quartararo | B64G 1/26 244/169 |
| 6,125,310 A | 9/2000 | Holmes | |
| 6,237,876 B1 | 5/2001 | Barker | |
| 6,253,125 B1 | 6/2001 | Barker | |
| 6,263,264 B1 | 7/2001 | Herman et al. | |
| 6,293,502 B1 | 9/2001 | Fowell | |
| 6,435,457 B1 * | 8/2002 | Anzel | B64G 1/26 244/169 |
| 6,481,672 B1 * | 11/2002 | Goodzeit | B64G 1/26 244/169 |
| 6,685,142 B1 | 2/2004 | Fichter et al. | |
| 6,860,451 B1 * | 3/2005 | Wang | B64G 1/244 244/164 |
| 7,113,851 B1 | 9/2006 | Gelon et al. | |
| 7,376,496 B1 | 5/2008 | Weigl et al. | |
| 7,464,898 B1 * | 12/2008 | Goodzeit | B64G 1/26 244/164 |
| 7,464,899 B2 | 12/2008 | Elgersma et al. | |
| 7,664,578 B2 | 2/2010 | Fowler et al. | |
| 7,823,836 B2 | 11/2010 | Ho et al. | |
| 8,066,226 B2 | 11/2011 | Fiala et al. | |
| 8,186,626 B1 | 5/2012 | Liu et al. | |
| 8,205,839 B2 | 6/2012 | Anzel et al. | |
| 8,443,683 B2 | 5/2013 | Rhee et al. | |
| 8,620,496 B2 * | 12/2013 | Liu | B64G 1/244 701/13 |
| 8,755,965 B1 | 6/2014 | McClintic | |
| 8,880,246 B1 | 11/2014 | Karpenko et al. | |
| 8,918,236 B2 | 12/2014 | Hamilton | |
| 9,115,662 B1 | 8/2015 | Claggett et al. | |
| 9,334,068 B2 | 5/2016 | Kronhaus | |
| 9,342,907 B1 | 5/2016 | Pedersen et al. | |
| 9,365,301 B2 | 6/2016 | Moro | |
| 9,522,746 B1 * | 12/2016 | Ih | G07C 5/0808 |
| 9,764,858 B2 | 9/2017 | Weiss et al. | |
| 9,926,087 B2 | 3/2018 | Doubrere | |
| 9,963,248 B2 * | 5/2018 | Wang | B64G 1/281 |
| 10,005,568 B2 | 6/2018 | Lui et al. | |
| 10,006,446 B2 | 6/2018 | Purvis | |
| 10,023,300 B2 | 7/2018 | Straub et al. | |
| 10,175,700 B2 | 1/2019 | Lui et al. | |
| 10,377,513 B2 | 8/2019 | Lui et al. | |
| 10,407,185 B2 | 9/2019 | Lui et al. | |
| 10,407,187 B2 * | 9/2019 | Kitamura | B64G 1/286 |
| 2003/0197096 A1 | 10/2003 | Defendini et al. | |
| 2004/0050191 A1 | 3/2004 | Chung | |
| 2005/0005719 A1 | 1/2005 | Chung | |
| 2005/0247145 A1 | 11/2005 | LeGoff | |
| 2006/0049315 A1 * | 3/2006 | Patel | B64G 1/283 244/169 |
| 2008/0035797 A1 | 2/2008 | Defendini et al. | |
| 2008/0105788 A1 | 5/2008 | Anzel et al. | |
| 2008/0128559 A1 | 6/2008 | Ho et al. | |
| 2008/0315039 A1 | 12/2008 | Rudd et al. | |
| 2009/0020650 A1 | 1/2009 | Ho | |
| 2009/0078829 A1 | 3/2009 | Ho et al. | |
| 2009/0108136 A1 | 4/2009 | Suzuki | |
| 2009/0251773 A1 | 10/2009 | Danziger et al. | |
| 2011/0024571 A1 * | 2/2011 | Tsao | B64G 1/281 244/171 |
| 2011/0219893 A1 | 9/2011 | Fiala et al. | |
| 2012/0325970 A1 | 12/2012 | Hamilton | |
| 2013/0292516 A1 | 11/2013 | Celerier | |
| 2013/0313369 A1 | 11/2013 | Celerier | |
| 2014/0209750 A1 | 7/2014 | Guyot | |
| 2014/0361124 A1 | 12/2014 | Celerier | |
| 2015/0001345 A1 * | 1/2015 | Polle | B64G 1/283 244/158.6 |
| 2015/0162656 A1 | 6/2015 | Fitz-Coy et al. | |
| 2016/0194095 A1 * | 7/2016 | Weiss | B64G 1/26 701/13 |
| 2017/0081048 A1 | 3/2017 | Glogowski et al. | |
| 2017/0129627 A1 | 5/2017 | Moro et al. | |
| 2017/0225805 A1 | 8/2017 | Wang et al. | |
| 2017/0225806 A1 | 8/2017 | Sobel et al. | |
| 2017/0320599 A1 | 11/2017 | Jeon et al. | |
| 2017/0361123 A1 | 12/2017 | Efremkin | |
| 2018/0029727 A1 | 2/2018 | Doubrere | |

(56) References Cited

U.S. PATENT DOCUMENTS

2018/0072435 A1 3/2018 Cuilleron et al.
2018/0194495 A1 7/2018 Lui et al.
2018/0275683 A1 9/2018 Lui et al.

FOREIGN PATENT DOCUMENTS

EP 0788045 12/1999
RU 2309876 11/2007

OTHER PUBLICATIONS

Bryce A. Roberts et al., "Three-axis Attitude Control with Two Reaction Wheels and Magnetic Torquer Bars", AIAA Guidance, Navigation, and Control Conference and Exhibit, Aug. 16-19, 2004, Providence, RI, Paper AIAA 2004-5245, Aug. 16, 2004, 8 pages.
Tong, Donald, "Spacecraft Momentum Dumping Using Gravity Gradient", Journal of Spacecraft and Rockets, American Institute of Aeronautics and Astronautics, vol. 35, No. 5, Sep.-Oct. 1998, 4 pages.
United States Patent and Trademark Office, "Notice of Allowance and Fee(s) Due," issued in connection with U.S. Appl. No. 15/728,281, dated Oct. 18, 2018, 73 pages.
United States Patent and Trademark Office, "Notice of Allowance and Fee(s) Due," issued in connection with U.S. Appl. No. 14/940,811, dated Jul. 10, 2017, 18 pages.
United States Patent and Trademark Office, "Advisory Action," issued in connection with U.S. Appl. No. 14/940,811, dated May 18, 2017, 4 pages.
United States Patent and Trademark Office, "Final Office Action," issued in connection with U.S. Appl. No. 14/940,811, dated Mar. 7, 2017, 29 pages.
United States Patent and Trademark Office, "Non-Final Office Action," issued in connection with U.S. Appl. No. 14/940,811, dated Nov. 4, 2016, 27 pages.
Canadian Intellectual Property Office, "Examination Report," issued in connection with Canadian Patent Application No. 2,941,062, dated Jul. 16, 2019, 5 pages.
United States Patent and Trademark Office, "Notice of Allowance and Fee(s) Due," issued in connection with U.S. Appl. No. 16/192,411, dated Jun. 25, 2019, 12 pages.
Japanese Patent Office, "Notice of Reasons for Rejection," issued in connection with Japanese Patent Application No. 2016-217175, dated Aug. 11, 2020, 6 pages.
Roberts et al., "Three-axis Attitude Control with Two Reaction Wheels and Magnetic Torquer Bars," American Institute of Aeronautics and Astronautics, 2004, 8 pages.
Canadian Intellectual Property Office, "Examination Report," issued in connection with Canadian Patent Application No. 2,941,062 dated Apr. 23, 2020, 3 pages.
Federal Institute of Industrial Property, "Office Action," issued in connection with Patent Application No. 2016133882/11 dated Feb. 20, 2020, 12 pages. English translation included.
M., Viniti, Resume of Science and Technology: Examination of the Aerospace, Questions About Orientation of Artificial Satellites, vol. 11, 1978, 28 pages. Machine translation included.

* cited by examiner

ENERGY EFFICIENT SATELLITE MANEUVERING

RELATED APPLICATION

This patent arises as a continuation of U.S. patent application Ser. No. 16/192,411, which was filed on Nov. 15, 2018 and which claims priority to U.S. patent application Ser. No. 15/728,281, which was filed on Oct. 9, 2017 and which claims priority to U.S. patent application Ser. No. 14/940,811, which was filed on Nov. 13, 2015, now granted as U.S. Pat. No. 10,005,568. The foregoing U.S. patent applications are hereby incorporated herein by reference in their entirety.

FIELD OF THE DISCLOSURE

This patent relates generally to satellites and, more particularly, to energy efficient satellite maneuvering.

BACKGROUND

Space vehicles such as satellites or resident space objects (RSO) typically encounter significant gravity torque (e.g., environmental torque, environmental torque disturbances, etc.) following launch during maneuvers to a final orbit. Typically, a satellite or resident space object (RSO) orbiting the Earth may be positioned in a parking or initial orbit (e.g., a first orbit) before performing an initial maneuver to initiate a transfer orbit (geosynchronous transfer orbit, etc.) to reach a final orbit. The satellite may then perform a final maneuver to maintain the final orbit. For example, the satellite may start from a low earth orbit (LEO) and maneuver through a geosynchronous transfer orbit (GTO) to reach a final geosynchronous orbit (GEO). During these maneuvers, gravity torque and/or momentum increases of a satellite may require significant use of thrusters and/or momentum devices.

To counteract this gravity gradient torque and/or momentum, some typical satellites utilize reaction wheels that are located within these satellites. In particular, a reaction wheel includes a flywheel that may rotate at different speeds for attitude control of a satellite. However, these reaction wheels require additional payload space and/or weight and may also require energy to operate. Further, some more recent satellites employ deployable solar panels to generate power while such satellites move towards a final orbit, thereby increasing a moment of inertia and, thus, greater susceptibility to gravity gradient torques, thereby necessitating use of relatively larger reaction wheels, which, in turn, require more payload space and weight for respective launch vehicles.

SUMMARY

An example method includes maneuvering a satellite that is in an orbit around a space body so that a principle sensitive axis of the satellite is oriented to an orbit frame plane to reduce gravity gradient torques acting upon the satellite. The orbit frame plane is based on an orbit frame vector.

An example apparatus includes a maneuvering device of a satellite, and an orientation controller to cause the maneuvering device to orient a principle sensitive axis of the satellite to an orbit frame plane to reduce gravity gradient torques acting upon the satellite.

Another example method includes maneuvering a satellite that is in an orbit around a space body to orient a principle sensitive axis of the satellite to an orbit frame plane. The orbit frame plane is defined by an orbit frame vector. The example method also includes operating at least one thruster of the satellite to cause a resultant thrust vector to be perpendicular to the principle sensitive axis to alter an orbital distance of the satellite.

Yet another example method includes maneuvering a satellite orbiting a space body so that a functional vector of the satellite is within an orbit frame plane defined by an orbital frame vector. The orbital frame vector is directed from the satellite towards a center of the space body. The example method also includes slewing the satellite about the functional vector so that a principle sensitive axis of the satellite is oriented to the orbit frame plane.

An example tangible machine readable medium has instructions stored thereon, which when executed, cause a machine to access or determine inertial characteristics of a satellite orbiting a space body to identify a principle sensitive axis of the satellite, where the satellite has an associated functional vector, determine an orbit frame plane using an orbit frame transformation matrix, and determine an attitude of the satellite to orient the principle sensitive axis to the determined plane, and to orient the functional vector relative to the principle sensitive axis based on a function of the functional vector.

Figure 1:
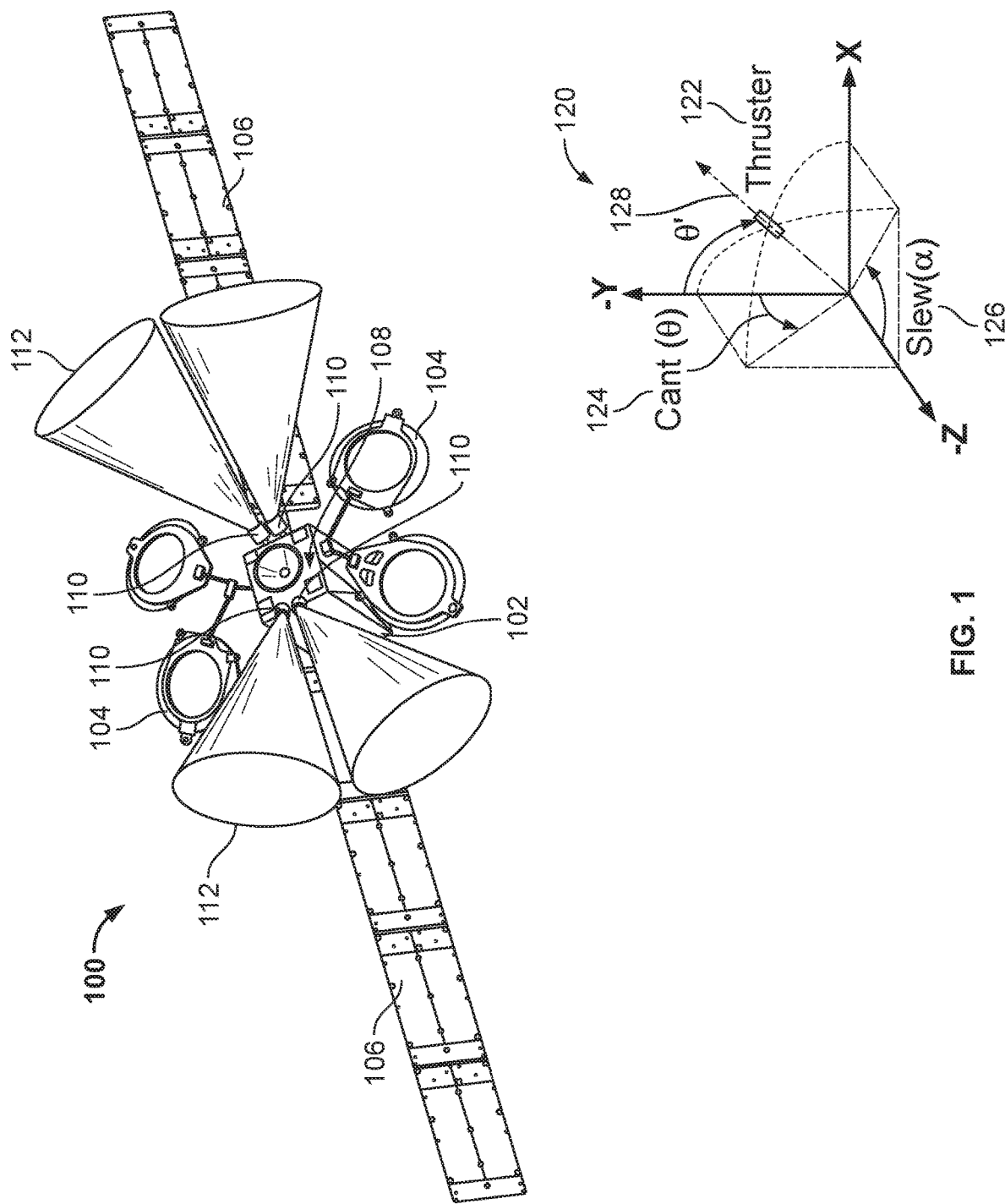
FIG. 1 is an example satellite in which the examples disclosed herein may be implemented.

Wherever possible, the same reference numbers will be used throughout the drawing(s) and accompanying written description to refer to the same or like parts. The figures are not to scale. Wherever possible, the same reference numbers will be used throughout the drawing(s) and accompanying written description to refer to the same or like parts.

DETAILED DESCRIPTION

Energy efficient satellite maneuvering is disclosed herein. Typically, a satellite or resident space object (RSO) orbiting the Earth may be positioned in a parking or initial orbit (e.g., a first orbit) before performing an initial maneuver to initiate a transfer orbit (geosynchronous transfer orbit, etc.) to reach a final orbit. The satellite may then perform a final maneuver to maintain the final orbit. For example, the satellite may start from a low earth orbit (LEO) and maneuver through a geosynchronous transfer orbit (GTO) to reach a final geosynchronous orbit (GEO). During such maneuvering, the satellite may encounter gravity gradient torques and/or increased momentum build-up. Further, even in an established orbit (e.g., a final orbit), the satellite may encounter gravity gradient torque caused by inertial characteristics of the satellite (e.g. during a perigee of an orbit).

During these maneuvers and/or maintenance of an orbit, gravity torque and/or momentum accumulation of a satellite may require significant use of thrusters or other movement devices and, therefore, depletion of fuel/thrust resources (e.g., thrust fuel, stored thrust energy) stored within the satellite and/or significant use of reaction wheels to counteract this gravity torque and/or excess momentum. However, these reaction wheels often require additional payload space and/or weight and may also require significant energy to operate during a maneuver or re-orientation of the satellite. Some satellites employ deployable solar panels, thereby increasing a moment of inertia of the satellite, which can necessitate use of even larger reaction wheels and, thus, even more payload space and weight and/or required energy for operation.

The examples disclosed herein enable more compact and lighter satellites as a result of energy efficient satellite maneuvering. In particular, more efficient satellite maneuvering allows relatively lighter and more space efficient movement and/or momentum devices (e.g., more compact thrusters, reaction wheels, momentum storage devices, etc.). The examples disclosed herein orient and/or determine an orientation of a satellite so that a sensitive axis of the satellite is oriented (e.g., aligned) to a determined orbit frame plane to reduce (e.g., minimize) gravity gradient torques. In some examples, a thrust vector of the satellite is oriented to be perpendicular to a sensitive axis of the satellite to reduce gravity gradient torques acting on the satellite during an orbital raise, for example. This reduction of gravity gradient torques allows the satellite to be maneuvered (e.g., between orbits or within an orbit) with relatively less energy and/or reduced use of these reaction wheel(s), for example. Thus, the reduced energy requirements enable the satellite to be significantly more compact and lighter, thereby reducing required payload space for delivery vehicles (e.g., payload space delivery vehicles, rockets, a space shuttle, etc.).

As used herein, the term "satellite" may refer to an RSO and vice-versa. As used herein, the term "satellite" refers to an object orbiting a planet or other object in space. As used herein, the term "sensor data" refers to information from a sensor used to obtain positional knowledge of a satellite including, but not limited to, time and range, range-rate, azimuth angle, and/or elevation angle, etc. As used herein, the term "principal sensitive axis" refers to an axis of a satellite or space vehicle in which the gravity gradients can generate the highest amount of torque to the satellite or space vehicle. As used herein, the term "sensitive axis" refers to an axis or axes of a satellite or a space vehicle in which gravity gradients can generate a significant amount of torque to the satellite or space vehicle. As used herein, the term "benign axis" refers to an axis of the satellite or space vehicle in which gravity gradients generate an insignificant amount of torque (e.g., a minimal amount of torque). As used herein, to align/orient a vector and/or axis to a plane (e.g., a calculated plane or another vector), alignment/oriented means within 5 degrees of the plane. However, this range may vary based on the inertial properties of a satellite and/or capabilities of movement/thrust mechanisms of the satellite.

While the examples disclosed herein are shown related to orbit thrust raising and/or maintaining orbits, the examples disclosed herein may be applied to other satellite/RSO applications including, but not limited to, an attitude sensor boresight, an axis of rotation for solar wings, antenna boresights, an actuator vector, or a payload specific vector. In these other examples, a functional vector (e.g., a vector of importance) may be accounted for instead of a thrust vector, for example. These vectors may be related to operations and/or functions of the satellite that are not maneuvering related and/or for maintaining an orbit in an energy-efficient manner.

FIG. 1 is an example satellite 100 in which the examples disclosed herein may be implemented. The satellite 100 of the illustrated example includes a satellite body 102, which includes on-board processors, batteries and/or fuel tanks, antennae (e.g., communication antennae, etc.) 104, solar panels 106 and a propulsion system 108. The example propulsion system 108 includes thrusters 110 that have thrust cones 112. In this example, the solar panels 106 are in a deployed state (e.g., unfolded away from the satellite body 102), thereby altering the inertial/mass characteristics of the satellite 100 in contrast to an un-deployed state of the satellite 100 where the solar panels 106 are folded inward towards the satellite body 102.

In operation, the satellite 100 may communicate with external systems (e.g., transmit as well as receive) via the antennae 104 to maneuver the satellite 100 between orbital paths and/or orbital heights and/or to provide data to external ground-based systems, for example. In particular, the satellite 100 of the illustrated example is maneuvered by activating (e.g., firing) the thrusters 110, which are electric (e.g., ion based, an ion propulsion system, xenon based thrusters, etc.). For example, the satellite 100 may vary a duration and/or pulse of different thrusters of the thrusters 110 to maneuver the satellite 100 and/or control an attitude of the example satellite 100 relative to a space body that the satellite orbits.

In the example of FIG. 1, a maneuvering frame of reference 120 of the example satellite 100 is shown. The maneuvering frame of reference 120 illustrates a thruster plume angle 122 that is depicted by the symbol, θ', a cant angle 124 that is depicted by the symbol, θ, and a slew angle 126 that is depicted by the symbol, a. The frame of reference 120 depicts numerous degrees of rotational movement in which the satellite 100 may be oriented/rotated during an orbit or a movement between different orbits. In this example, a resultant vector 128 of the satellite 100 is shown. In particular, the example resultant vector 128 depicts a resulting direction of motion of the satellite 100 based on the vector sum of the activation and/or orientation of individual thrusters of the thrusters 110.

The examples disclosed herein allow the satellite 100 to utilize less energy and/or fuel to counteract gravity gradient torques and/or excess momentum (e.g., momentum build up). In particular, the examples disclosed herein enable energy efficient orbital transfers, orbit maintenance and/or re-orientation of the satellite 100. The resulting energy savings allows the example satellite 100 to be significantly smaller due to lower energy requirements and/or fewer required maneuvering components.

Figure 2:
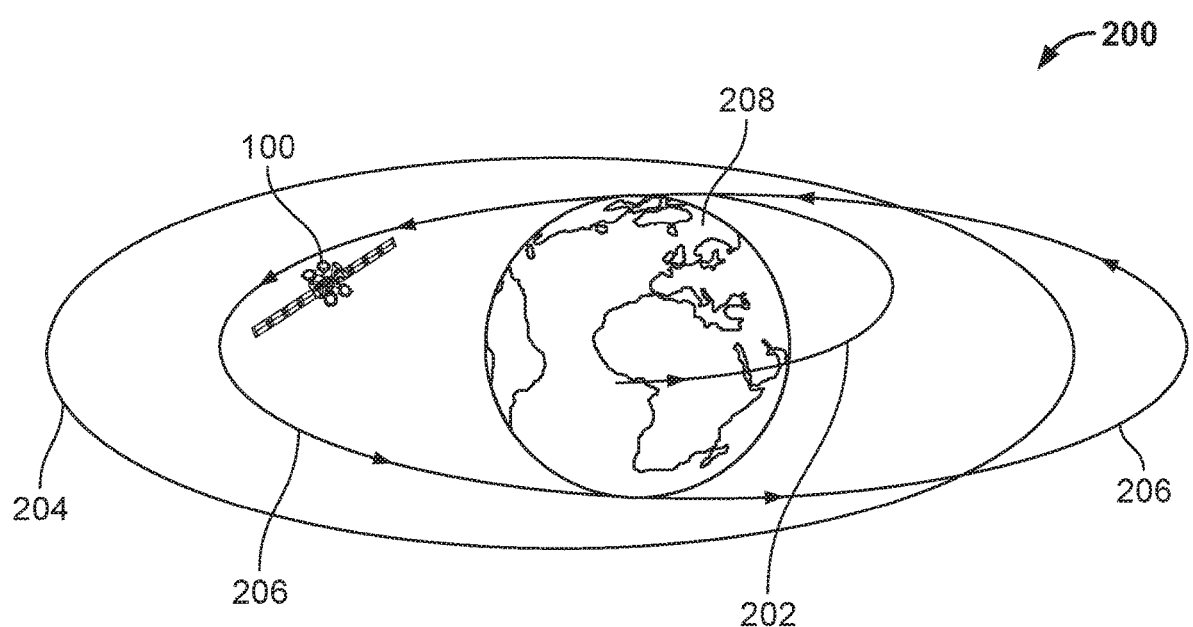
FIG. 2 is an example orbital pathway diagram of the example satellite of FIG. 1 moving from an initial orbit to a final orbit via a transfer orbit.

FIG. 2 is an example orbital pathway diagram 200 of the example satellite 100 of FIG. 1 moving from an initial orbit 202 to a final orbit 204 via a transfer orbit 206. In the illustrated example of FIG. 2, the satellite 100 orbits a space body or planet (e.g., Earth, Mars, etc.) 208 in the initial orbit 202 and is proceeding to the final orbit 204. In this example, the satellite 100 begins its travel along the transfer orbit 206 by performing an initial maneuver using the thrusters 110. As the satellite 100 moves from the initial orbit 202 to the final orbit 204, the satellite 100 moves along a path defined by the transfer orbit 206 and uses the thrusters 110 to perform a final maneuver to remain in the final orbit 204. While the example shown in the orbital pathway diagram 200 depicts the satellite 100 moving from the lower initial orbit 202 to the higher final orbit 204, in some examples, the satellite 100 does not complete the final maneuver to move into the higher final orbit 204, thereby causing the satellite 100 to orbit along the transfer orbit 206. Alternatively, the satellite 100 may proceed from the final orbit 204 to the lower/initial orbit 202.

Figure 3:
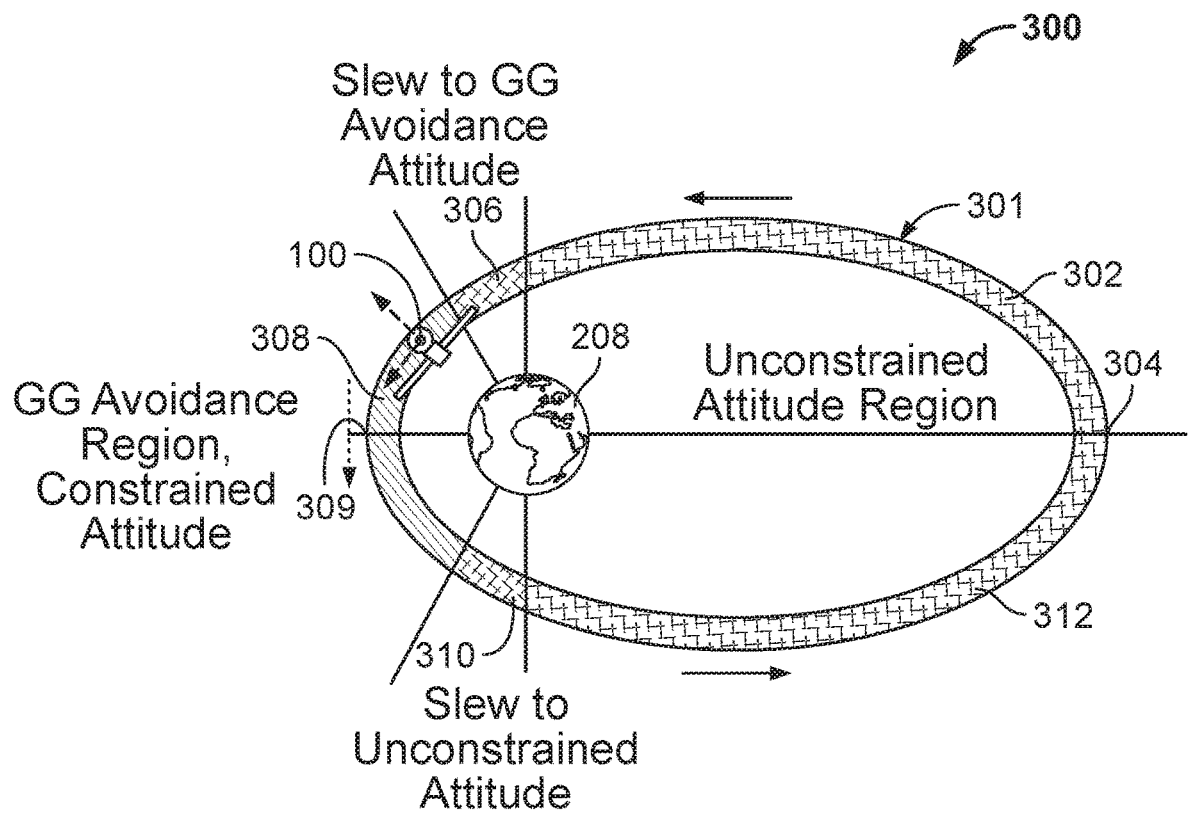
FIG. 3 is another example orbital pathway diagram depicting different maneuvering zones of an example final orbit.

FIG. 3 is another example orbital pathway diagram 300 depicting different maneuvering zones of an example final orbit/orbital pathway 301. In the illustrated example of FIG. 3, the satellite 100 is moving along the example orbit path 301, which includes an unconstrained attitude region 302 that is characterized by an orbit apogee (e.g., the greatest distance between the satellite 100 and the planet 208) 304 in which the satellite 100 encounters the least amount of gravitational gradients from the planet 208. The example orbit path 301 also includes a zone 306 in which the satellite 100 may be maneuvered (e.g., slewed) to an attitude in accordance with the teachings of this disclosure to avoid gravity gradient torque from the planet 208, and a zone 308 where gravity gradients from the planet 208 are avoided by maintaining a constrained attitude of the satellite 100. In this example, the zone 308 is characterized by an orbital perigee 309, in which the planet 208 exhibits the greatest amount of gravity gradients on the satellite 100 due to the satellite 100 being at the closest proximity (e.g., closest point) to the planet 208 in the example orbital path 301.

In the example of FIG. 3, the satellite 100 is slewed to an unconstrained attitude (e.g., the attitude/orientation of the satellite 100 is not maintained) in the region 310 of the orbital pathway 301. In this example, the orbital pathway 301 also includes an unconstrained attitude region 312 prior to the satellite 100 moving to the orbit apogee 304. The examples disclosed herein may be applied to transfer orbits (e.g., orbital raising) such as those shown in FIG. 2 as well as maintained orbits such as the example of FIG. 3.

Figure 4:
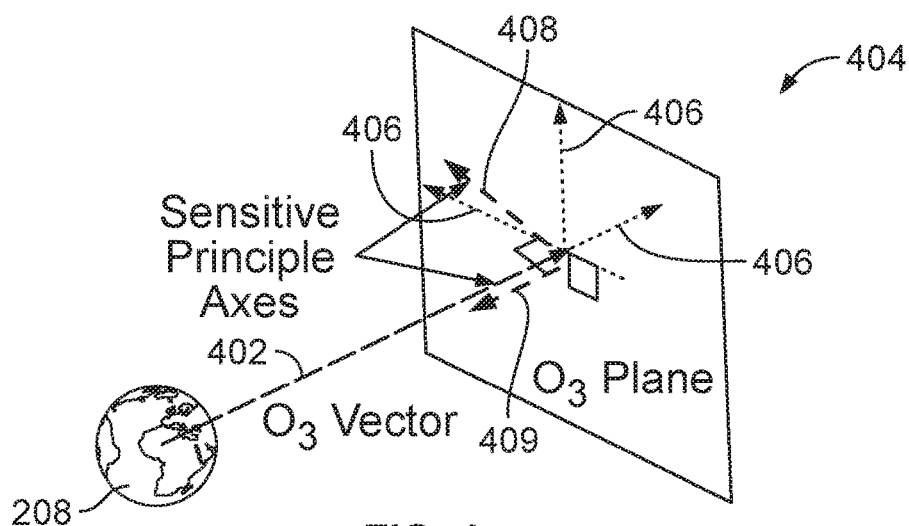
FIG. 4 illustrates an example orbit orientation in accordance with the teachings of this disclosure to reduce gravity gradient torques experienced by the example satellite of FIG. 1.

FIG. 4 illustrates an example orbit orientation in accordance with the teachings of this disclosure to reduce gravity gradient torques experienced by the example satellite 100 of FIG. 1. In particular, the example orientation and/or corresponding maneuver (e.g., maneuver to maintain the example orientation) of the satellite 100 is performed by defining an attitude (e.g., relative orientation) of the satellite 100 that can be maintained to reduce (e.g., minimize) gravity gradient torques encountered by the satellite 100 from the planet 208 as the satellite 100 maintains an orbit around the planet 208.

In the illustrated example of FIG. 4, the satellite 100 is orbiting the planet 208, thereby defining an orbital frame vector 402, which is denoted by the symbol, $O_3$, with a corresponding orbital frame plane 404, which is denoted as an $O_3$ plane. In this example, the vector 402 is defined from the center of gravity of the planet 208 to the center of gravity of the satellite 100. Based on the vector 402, the plane 404 is defined at the center of gravity of the satellite 100 and, also, perpendicular to the vector 402. In the example of FIG. 4, coordinate system axes 406 of the plane 404 are shown. In this example, sensitive principle axes 408, 409 of the satellite 100 are shown relative to the vector 402 and the plane 404. In this example, the sensitive axis 408 is the principle sensitive axis of the satellite 100.

In the example of FIG. 4, to avoid and/or reduce gravity gradient torque effects on the satellite 100, the principle sensitive axis 408 and/or at least one of the sensitive axes of the satellite 100 is placed within the plane 404. The determination and/or definition of a sensitive principle axis and/or any of the sensitive principle axes may be determined/defined using corresponding example calculations related to orientation/alignment/attitude of the satellite 100 as described in detail below in connection with FIG. 5. However, the example definitions, calculations and/or determinations described below are not exhaustive.

Additionally or alternatively, the example orientation/attitude shown in FIG. 4 may be used to switch orbits and/or orbital heights, for example. In particular, it can be advantageous to provide and/or direct thrust from the satellite 100 with minimal and/or substantially zero gravity gradient torque acting upon the satellite 100 during an orbital raise, for example. Alternatively, the sensitive axis 409 is the principle sensitive axis and, accordingly, gravity gradient torque can be reduced (e.g., minimized) by orienting (e.g., aligning) the sensitive axis 409 along either the orbital frame vector 402 or the orbital frame plane 404, for example.

Figure 5:
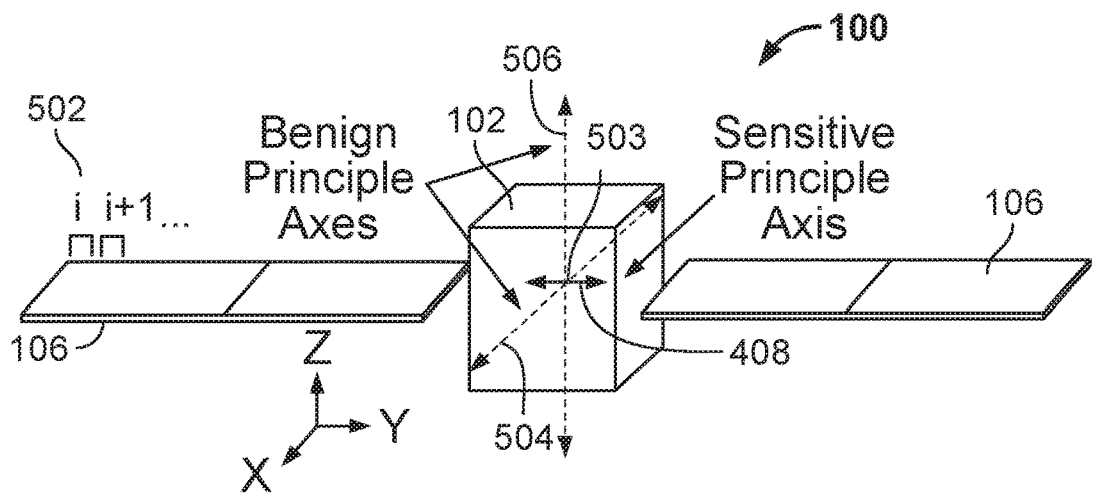
FIG. 5 is a simplified representation of the example satellite of FIG. 1 that illustrates determination of example axes associated with the example orbit orientation of FIG. 4.

FIG. 5 is a simplified representation of the example satellite 100 of FIG. 1 that illustrates determination of example axes corresponding to the example orbit orientation of FIG. 4 to reduce (e.g., minimize) gravity gradient torque acting upon the satellite 100. In particular, gravity gradient torques encountered by the satellite 100 are reduced and/or minimized based on the mass/inertial characterizations of the satellite 100 in combination with attitude control described above in connection with FIG. 4.

To reduce gravity gradient torques encountered by the satellite 100, the mass and/or inertial characteristics and experienced gravity gradient torque of the example satellite 100 are first determined and/or characterized, for example. In particular, the satellite 100 is characterized as discrete/discretized mass elements 502 at relative distances from a center of gravity 503 of the satellite 100. Therefore, the spatially dependent inertial characteristics of the satellite 100 may depend on whether the satellite 100 is in a deployed or un-deployed state (e.g., whether the solar panels 106 are deployed from the satellite body 102). In particular, the mass elements 502, which are denoted by i, i+1, etc. in this example, may be at varying distances from the center of gravity 503 and, thus, vary the overall inertial characteristics of the satellite 100. In this example, the mass/inertial characteristics of the mass elements 502 are used to define inertia tensor, I, and/or a mass/inertia matrix and/or for determining principle, sensitive and/or benign axes of the satellite 100. In this example, the inertia tensor, I, is a multivariable array defining inertial characteristics of the satellite 100 in directions, x, y and z shown in FIG. 5.

In the example of FIG. 5, based on the inertial properties of the satellite 100, a gravity gradient torque acting on the satellite 100 is calculated by Equation 1:

$$[\vec{\tau}_{gg}]^{B'} = 3\frac{GM}{r^3}\vec{O}_3 \times I^B\vec{O}_3, \quad (1)$$

where $\vec{\tau}_{gg}$ is the torque related to gravity gradients (in the satellite 100 body frame), where GM is the gravitational constant of the planet 208, where r is a distance between an inertial frame center for the planet 208 (e.g., a mass center of the planet 208) to the center of gravity of the satellite 100, where $\vec{O}_3$ is a vector (e.g., the vector 402) defined based on an axis 3, which is based on a third column of the body frame array, that extends from the center gravity of the satellite 100 to the inertial frame center (e.g., the geometric center and/or the center of gravity) of the planet 208, and where I is the inertia tensor of the satellite 100. In this example, the $\vec{O}_3$ vector is used to adjust a body frame (e.g., a body reference frame of the satellite 100) to an orbit frame based on the planet 208.

To calculate sensitive principle axes of the satellite 100, Equations 2 and 3 below are assumed notation in this calculation:

$$T^{B'B}I^B = I^{B'} = \begin{bmatrix} I_X & 0 & 0 \\ 0 & I_Y & 0 \\ 0 & 0 & I_Z \end{bmatrix}, \quad (2)$$

$$O_3 = \begin{bmatrix} T_{13} \\ T_{23} \\ T_{33} \end{bmatrix}, \quad (3)$$

where $I^{B'}$ is the principle inertia tensor, $T^{B'B}$ is the transformation from a geometric body frame to the principle axis at the center of gravity of the satellite 100, and $O_3$ is the third column the aforementioned body frame array of the satellite 100 with respect to the orbit frame, $T^{BO}$ that represents a vector from the center of gravity of the satellite 100 to the center of gravity of the planet 208. Based on the notations of equations (2) and (3), to calculate the torque experienced by the example satellite 100 in the principle axis of the example satellite 100, a cross product of $O_3$ and $I^{B'}O_3$ is taken, as expressed below by Equation 4:

$$[\vec{\tau}_{gg}]^{B'} = 3\frac{GM}{r^3}\vec{O}_3 \times I^{B'}\vec{O}_3 = 3\frac{GM}{r^3}\begin{bmatrix} T_{23}T_{33} & (I_Z - I_Y) \\ T_{13}T_{33} & (I_X - I_Z) \\ T_{13}T_{23} & (I_Y - I_X) \end{bmatrix}, \quad (4)$$

where $T^{B'B}$ can be used to rotate $[\vec{\tau}_{gg}]^{B'}$ back into a geometric body frame, in some examples. As can be seen in Equation 4, torque acting on the example satellite 100 is proportional to principle inertial differences in different orientations. The most significant principle inertial differences correspond to the most sensitive principle axes. For example, if $I_X$ and $I_Z$ are identical, gravity gradient torque in the y principle axis will be zero. In another example, if $I_Y$ is significantly less than $I_X$ and $I_Z$, torque acting relative to $I_Y$ and/or in the y direction will produce the largest torque, thereby resulting in $I_Y$ being the most sensitive principle axis. In the view of FIG. 5, the principle sensitive axis 408 of FIG. 4 is shown as well as benign axes 504, 506. The benign axes 504, 506 of the illustrated example of FIG. 5 indicates axes in which the satellite 100 is not sensitive to gravity gradient torques (i.e., not sensitive to a requisite degree, etc.).

In some examples, sensitive and benign axes of a space vehicle are determined based on known mass/inertial characteristics of the space vehicle (e.g., pre-defined based on the design of the space vehicle). For example, mass characteristics of the satellite body 102 and the solar panels 106 may be known based on a design of the satellite 100. While the satellite 100 of the illustrated example is symmetric along multiple axes, an asymmetric mass/inertia distribution of a satellite can result in numerous sensitive axes. However, in such examples, there is one sensitive axis that can experience the highest amount of gravity gradient torque and, thus, is designated the sensitive principle axis. While the example calculations of FIG. 5 are used for the determinations above, these examples are not exhaustive and any appropriate calculation(s) and/or calculation methods may be used. Some other examples disclosed below in FIGS. 6-9 utilize these example calculations of sensitive and benign axes to orient thrust vectors and/or functional vectors to minimize gravity gradient torques.

Figure 6:
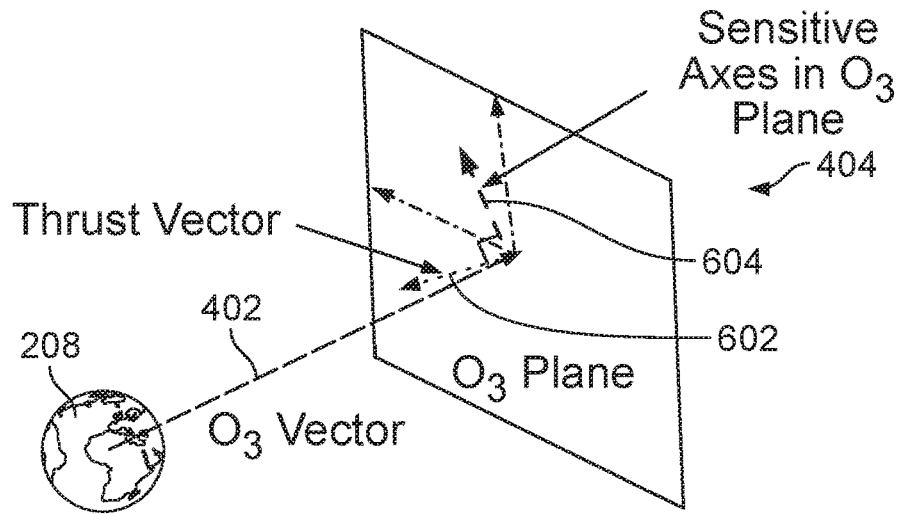
FIG. 6 illustrates example vectors and planes of a first example orbital raising/lowering thrust maneuver of the example satellite of FIG. 1 in accordance with the teachings of this disclosure.

FIG. 6 illustrates example vectors and planes of FIG. 1 of a first example orbital raising thrust maneuver of the example satellite 100 in accordance with the teachings of this disclosure. In the example of FIG. 6, the satellite 100 is transferring from a lower orbit (e.g., the orbit 202) to a higher altitude orbit (e.g., the orbit 204) during an orbital raising process. Alternatively, the satellite 100 may be transferring from a higher orbit to a lower orbit.

Similar to the example described above in connection with FIGS. 4 and 5, the orbital frame vector 402 and the orbital frame plane 404 are shown. However, in the example of FIG. 6, a thrust vector (e.g., a resultant thrust vector) 602 of the satellite 100, which corresponds to the orbital raise maneuver away from the planet 208, is shown. In this example, the satellite 100 has a principle sensitive axis 604 that is within the plane 404, and the thrust vector 602 is perpendicular to the principle sensitive axis 604, thereby reducing gravity gradient torques encountered by the satellite 100 resulting from thrust during this example maneuver. As a result, the reduction in gravity gradient torques reduces an amount of maneuvering necessary from the thrusters 110 and/or momentum devices of the satellite 100, thereby enabling greater compactness and/or weight savings of the satellite 100.

In this example, the principle sensitive axis 604 of the satellite 100 is calculated using the examples described above in connection with FIGS. 4 and 5. In particular, the principle sensitive axis 604 is determined based on the inertial characteristics of the satellite 100. As mentioned above in connection with FIG. 5, differences in inertia values amongst different coordinate axes results in significant torque experienced by the satellite 100.

During execution of the example thrust maneuver of FIG. 6, gravity gradient torques experienced by the satellite 100 are reduced (e.g., minimized) based on orientation (e.g., alignment) of the principle sensitive axis 604 to the plane 404 in combination with the perpendicular orientation of the thrust vector 602 to the principle sensitive axis 604. Alternatively, the principle sensitive axis 604 may be oriented to the vector 402.

Because the thrust vector 602 of the satellite 100 of the illustrated example is perpendicular to the principle sensitive axis 604, the torque experienced by the satellite 100 resulting from thrust, which can be controlled as a net overall thrust, is minimized, for example. In some examples, the perpendicularity of the thrust vector 602 to the principle sensitive axis 604 is accomplished by controlling the thrusters 110 so that the resultant thrust from the thrusters 110 defines the thrust vector 602 that is perpendicular to the sensitive axis 604. In other words, the direction of thrust may be controlled by directional orientation of at least one of the thrusters 110 and/or resultant thrust from multiple of the thrusters 110, which may not be necessarily oriented along the thrust vector 602. As a result of this coordinated control of the thrusters 110, orienting the thrust vector and/or resultant thrust vector 602 to be relatively close and/or aligned with the center of gravity of the satellite 100 reduces torque transmitted to the satellite 100, thereby reducing necessary equipment and/or payload to counteract the torque that would otherwise be experienced by the satellite 100 during thrust maneuvers, for example. Further, electric satellites often require deployed solar panels during a transition to a higher orbit, which have a larger characteristic resultant gravity gradient torque. However, the examples disclosed herein may be used to counteract the inertial effects of these deployed states.

The example orientation and/or thrust maneuver of FIG. 6 may be executed during a transfer orbit, during an entire orbit and/or a portion of an orbit. For example, the attitude control described herein may be used during portions of a final orbit (e.g., during when the satellite 100 travels close to a perigee of an orbit) around the planet 208. In some examples, the example thrust maneuver is performed in a space body (e.g., a planet, Earth, Venus, etc.) inertial frame such as an Earth centered inertial frame (ECI), for example.

While the examples disclosed herein show general orientation alignment (e.g., precise alignment) of principle sensitive axes with orbital frame planes and/or precise perpendicularity of thrust vectors to principle sensitive axes, complete alignment is not necessary to reduce gravity gradient torques experienced by the satellite 100 in any of the examples disclosed herein. As such, to reduce gravity gradient torques, the principle sensitive axis 604 can be aligned/oriented to a certain degree to the plane 404 (e.g., within 5 degrees) or the vector 402 to reduce gravity gradient torques. Similarly, the thrust vector 602 can also be normal to the principle sensitive axis 604 within a certain degree (e.g., perpendicular within 5 degrees of the sensitive principle axis 604). In other words, the benefits of gravity gradient torque reduction based on the examples disclosed herein may be seen even without precise orientation/alignment of the principle sensitive axis 604 and the thrust vector 602. The degree to which a principle sensitive axis is oriented to an orbit frame plane/vector and/or to which a thrust vector is normal to a principle sensitive axis may vary based on properties of a satellite (e.g., inertial properties) and/or a degree to which the satellite can maneuver (e.g., effectiveness of thrust and/or momentum devices on the satellite).

Figure 7:
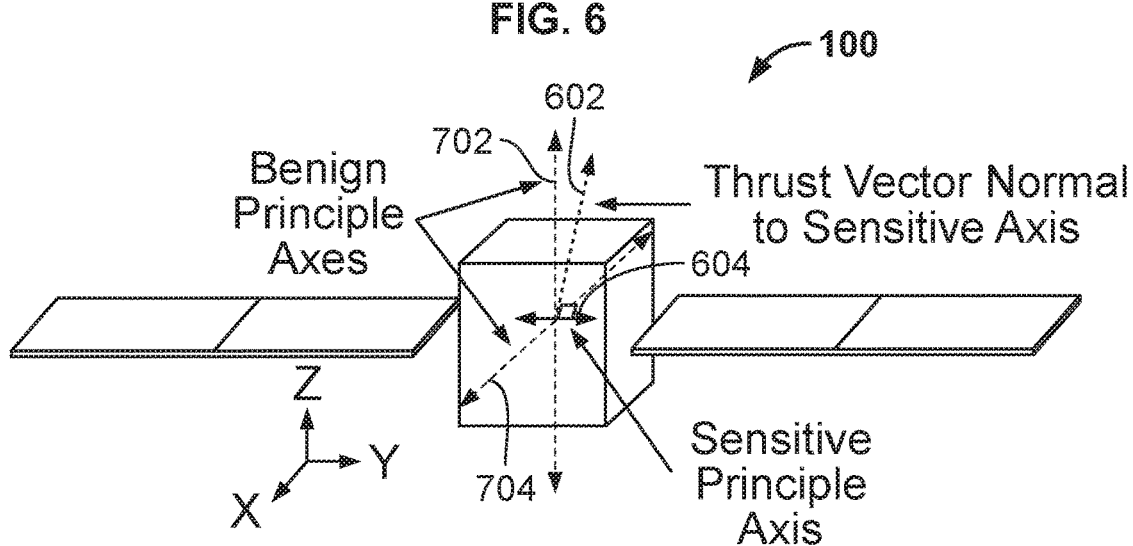
FIG. 7 is a simplified representation of the example satellite of FIG. 1 that illustrates example directional axes associated with the first example orbital raising/lowering thrust maneuver of FIG. 6.

FIG. 7 is a simplified representation of the example satellite 100 of FIG. 1 that illustrates example directional axes associated with the first example orbital raising/lowering thrust maneuver of FIG. 6. In the view of FIG. 7, benign principle axes 702, 704 are shown relative to the principle sensitive axis 604 of the satellite 100. The benign principle axes 702, 704 of the illustrated example are axes that are not largely affected by gravity gradient torques provided to the satellite 100. However, the sensitive principle axis 604 can be significantly affected by torques due to the mass distribution of the satellite 100 along the y-direction, as indicated by the x, y, z coordinate system shown in FIG. 7.

To minimize torque applied to the satellite 100, the thrust vector 602 is shown oriented perpendicular to the sensitive principle axis 604. As mentioned above in connection with FIG. 6, alignment of the thrust vector 602 to the center of gravity of the satellite 100 reduces and/or minimizes the amount of torque applied to the satellite 100 due to thrust by reducing (e.g., minimizing) a distance separation (e.g., a delta, an alignment separation) of the thrust vector 602 to the center of gravity of the satellite 100.

Figure 8:
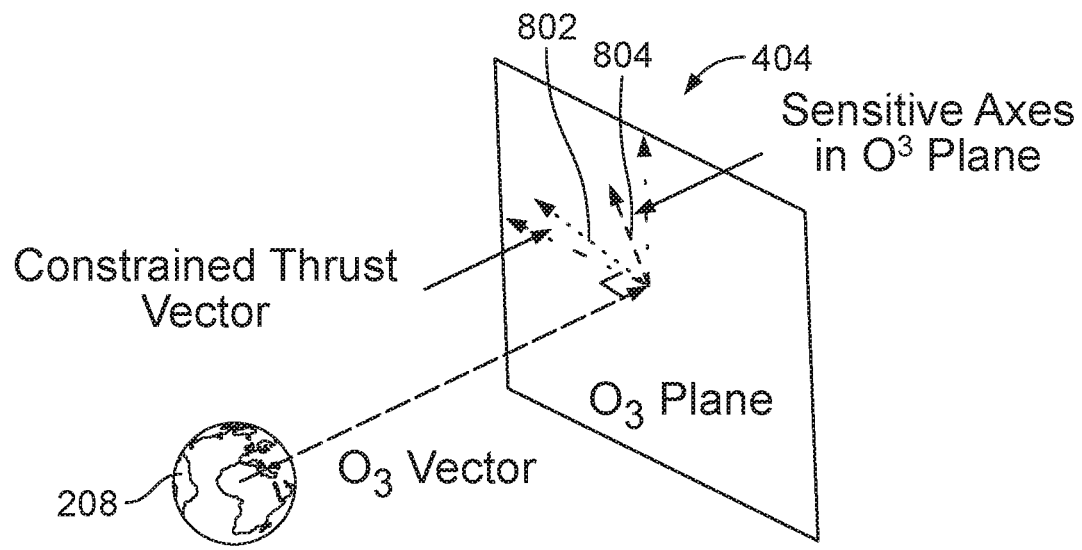
FIG. 8 illustrates example vectors and planes of a second example orbital raising/lowering thrust maneuver of the example satellite of FIG. 1 in accordance with the teachings of this disclosure.

FIG. 8 illustrates example vectors and planes of the example satellite 100 of a second example orbital raising/lowering thrust maneuver in accordance with the teachings of this disclosure. In contrast to the example of FIGS. 6 and 7, in this example, as the satellite 100 orbits the planet 208, the satellite 100 is not able to generate a thrust vector 802 at an orientation that is perpendicular to a principle sensitive axis 804 of the satellite 100. The inability of the satellite 100 to generate a thrust vector that is perpendicular to the principle sensitive axis 804 may be a result of a thruster malfunction (e.g., one or more thrusters inoperable and/or damaged) or a configuration and/or spatial arrangement of the thrusters 110 that limits directional capabilities of a net thrust resulting from the thrusters 110.

In the example of FIG. 8, the satellite 100 is first rotated (e.g., slewed) so that the thrust vector 802 of the satellite 100 is oriented to the orbital frame plane 404. The satellite 100 is then slewed about the thrust vector 802 until the principle sensitive axis 804 is oriented to the plane 404. As mentioned above, the thrust vector 802 of the illustrated example is not perpendicular to the principle sensitive axis 804. However, the gravity gradient torque experienced by the satellite 100 is still reduced and/or eliminated.

Figure 9:
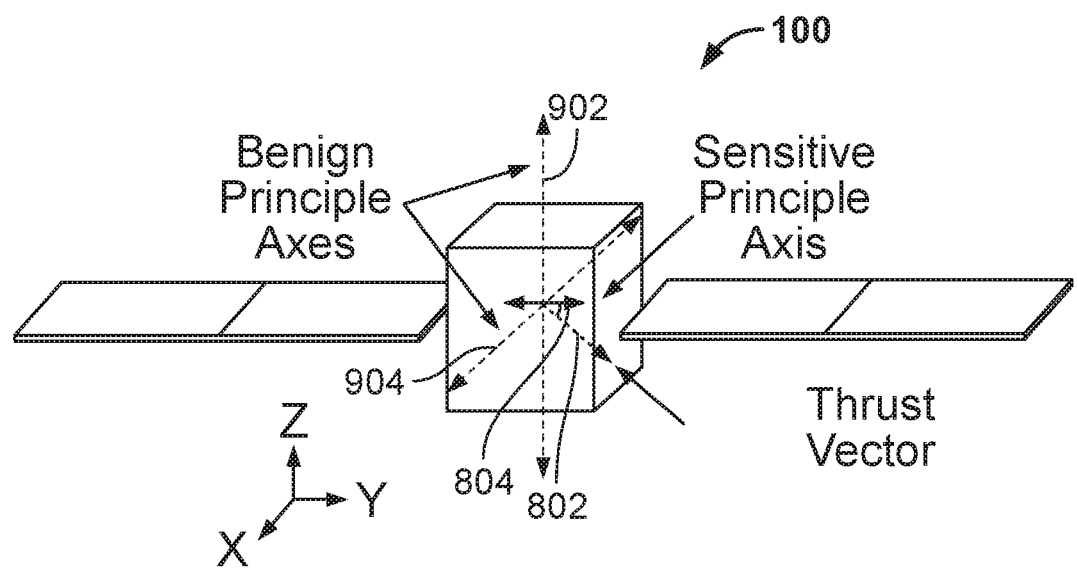
FIG. 9 is a simplified representation of the example satellite of FIG. 1 that illustrates example directional axes associated with the second example orbital raising/lowering thrust maneuver of FIG. 8.

FIG. 9 is a simplified view of the example satellite 100 of FIG. 1 that illustrates example direction axes associated with the second example orbital raising/lowering thrust maneuver of FIG. 8. As can be seen in the view of FIG. 9, the satellite 100 in this example includes benign axes 902 and 904 in relation to the thrust vector 802 and the principle sensitive axis 804. In contrast to the example of FIGS. 6 and 7, the thrust vector 802 is not perpendicular to the principle sensitive axis 804.

In the example of FIG. 9, the satellite 100 is slewed (e.g., continuously slewed) about the thrust vector 802 to maintain the thrust vector 802 within the plane 404 via received sensor data, for example. The example satellite 100 is also slewed (e.g., continuously slewed, periodically slewed, etc.) about the thrust vector 802 to maintain the principle sensitive axis 804 and/or a sensitive axis of the satellite 100 within the plane 404. In particular, a control algorithm may be used to slew the satellite 100 based on current or predicted position(s) and/or attitude(s) of the satellite 100 based on the received sensor data.

As mentioned above, the examples disclosed herein may be used for other applications besides orbital maintenance or orbital raising/lowering (e.g., altering an orbital range/radius). For example, a functional vector such as a directed communication vector, a solar panel directed vector, a payload specific vector, or a visual sensor vector may be directed/oriented in the orbital frame instead of a thrust vector. Dependent on the relevant function, these vectors may be oriented relative to a sensitive principle axis (e.g., perpendicular) and/or relative to an orbital frame vector/plane (e.g., parallel or within) to minimize an encountered gravity gradient torque. For example, a payload specific vector may be pointed towards a space body while a sensitive axis of a satellite may be positioned within an orbital frame plane. Additionally or alternatively, the functional vector is oriented/aligned to the orbital frame plane.

Figure 10:
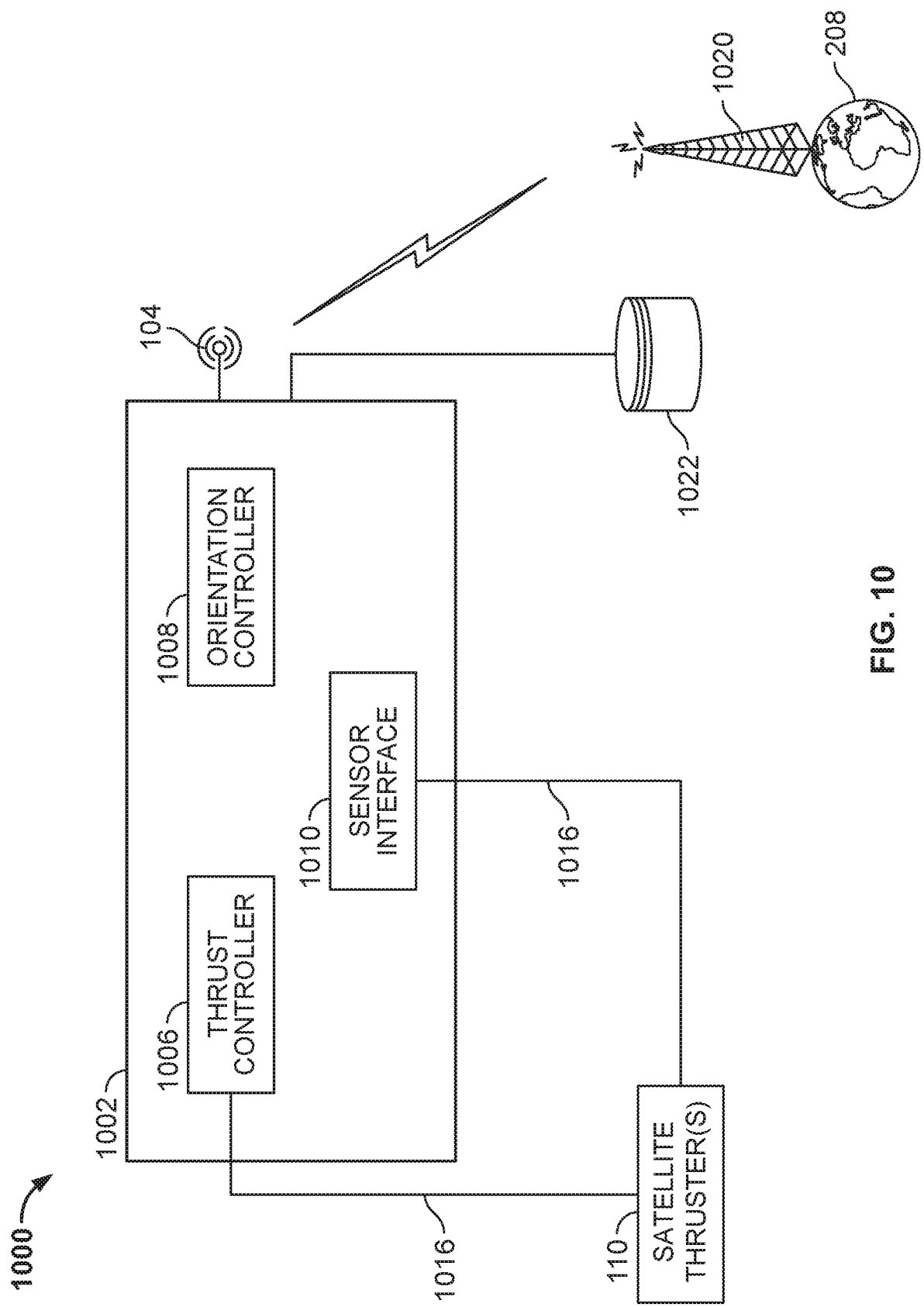
FIG. 10 is an example satellite energy conservation system that may be used to implement the examples disclosed herein.

FIG. 10 is an example satellite energy conservation system 1000 that may be used to implement the examples disclosed herein. The satellite energy conservation system 1000 of the illustrated example, which is implemented in a satellite (e.g., the satellite 100), has a satellite guidance system 1002, which includes a thrust controller 1006, an orientation controller 1008 and a sensor interface 1010. The example energy conservation system 1000 also includes communications lines 1016 that communicatively couple the guidance system (e.g., a satellite guidance system) 1002, the thrust controller 1006 and/or the sensor interface 1010 to the satellite thruster(s) 110 shown in FIG. 1. In this example, the guidance system 1002 is also communicatively coupled to the antenna 104 which, in turn, is in communication with a ground-based communication system 1020 of the planet 208 in which the satellite orbits). In the example of FIG. 10, the guidance system 1002 is communicatively coupled to and/or includes a database 1022.

In operation, the sensor interface 1010 determines a position and/or attitude of the example satellite. In particular, the sensor interface 1010 determines a position, attitude and/or velocity/acceleration vector of the satellite based on sensor data and/or received sensor data from the ground communication system 1020 of the planet 208.

In this example, the satellite is proceeding to a higher orbit based on commands received from the ground communication system 1020 at the antenna 104. The orientation controller 1008 of the illustrated example determines an orbital reference frame plane (e.g., the plane 404) based on a vector (e.g., the vector 402) defined from the satellite to the planet 208. The orientation controller 1008 of the illustrated example calculates a principle sensitive axis of the satellite. In other examples, the orientation controller accesses mass/inertia data and/or a pre-defined sensitive axis of the satellite from the database 1022. In yet other examples, the sensitive principle axis is assigned (e.g., received from, continuously received from, uploaded from) the ground communication system 1020. In some examples, the orientation controller 1008 of the illustrated example also calculates an attitude shift (e.g., an attitude delta) of the satellite required to orient the principle sensitive axis of the satellite to the orbital reference frame plane. Additionally or alternatively, the example orientation controller 1008 calculates an attitude of the satellite in which the principle sensitive axis is oriented to the orbital reference frame plane and a thrust vector of the satellite is perpendicular to the principle sensitive axis to move the satellite into the higher orbit while reducing (e.g., minimizing) gravity gradient torques acting on the satellite. In some examples, the orientation controller 1008 is a manually controlled interface via the ground communication system 1020, for example.

Based on the determined/calculated attitude, the thrust controller 1006 controls numerous thrusters of the satellite thrusters 110 to move the satellite to the determined/calculated attitude determined from the orientation controller 1008. In some examples, the thrust controller 1006 controls a thrust pattern of multiple thrusters and/or pulses multiple thrusters to define a resultant thrust vector to perform the maneuvers necessary to adjust the satellite to the determined attitude. Additionally or alternatively, the thrust controller 1006 controls a momentum device such as a momentum storage device and/or a reaction wheel to alter the attitude of the satellite.

In some examples, the sensitive axis of the satellite is calculated based on current conditions of the satellite, which may include fuel burn and/or changes of the satellite based on a deployed condition of the satellite (e.g., whether the solar panels of the satellite have deployed or are undeployed).

While an example manner of implementing satellite energy conservation system 1000 is illustrated in FIG. 10, one or more of the elements, processes and/or devices illustrated in FIG. 10 may be combined, divided, re-arranged, omitted, eliminated and/or implemented in any other way. Further, the example satellite guidance system 1002, the example thrust controller 1006, the example orientation controller 1008 and/or, more generally, the example satellite energy conservation system 1000 of FIG. 10 may be implemented by hardware, software, firmware and/or any combination of hardware, software and/or firmware. Thus, for example, any of the example satellite guidance system 1002, the example thrust controller 1006, the example orientation controller 1008 and/or, more generally, the example satellite energy conservation system 1000 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example satellite guidance system 1002, the example thrust controller 1006, and/or the example orientation controller 1008 is/are hereby expressly defined to include a tangible computer readable storage device or storage disk such as a memory, a digital versatile disk (DVD), a compact disk (CD), a Blu-ray disk, etc. storing the software and/or firmware. Further still, the example satellite energy conservation system 1000 of FIG. 10 may include one or more elements, processes and/or devices in addition to, or instead of, those illustrated in FIG. 10, and/or may include more than one of any or all of the illustrated elements, processes and devices.

Figure 11:
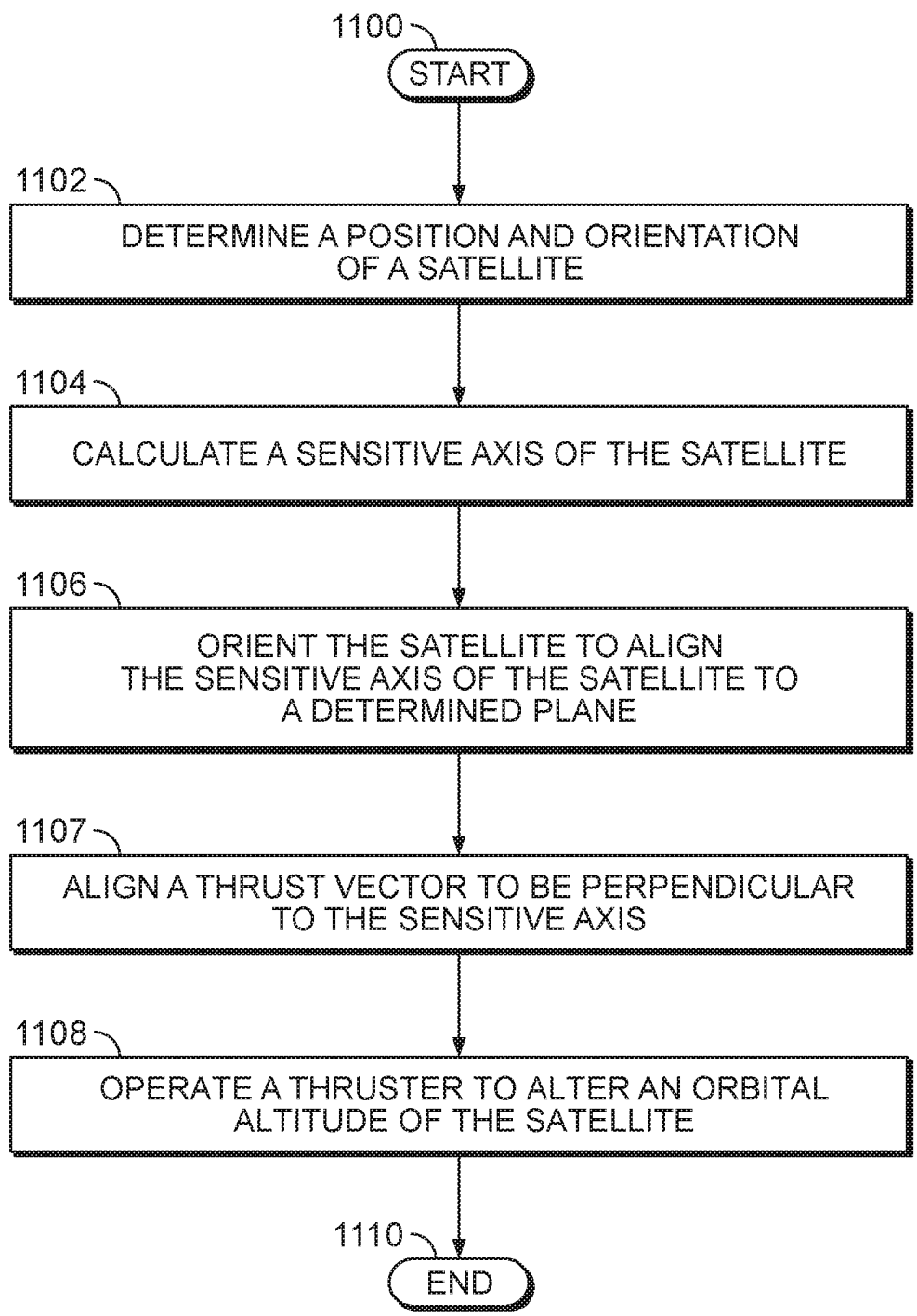
FIG. 11 is a flowchart representative of an example method to implement the examples disclosed herein.
Figure 12:
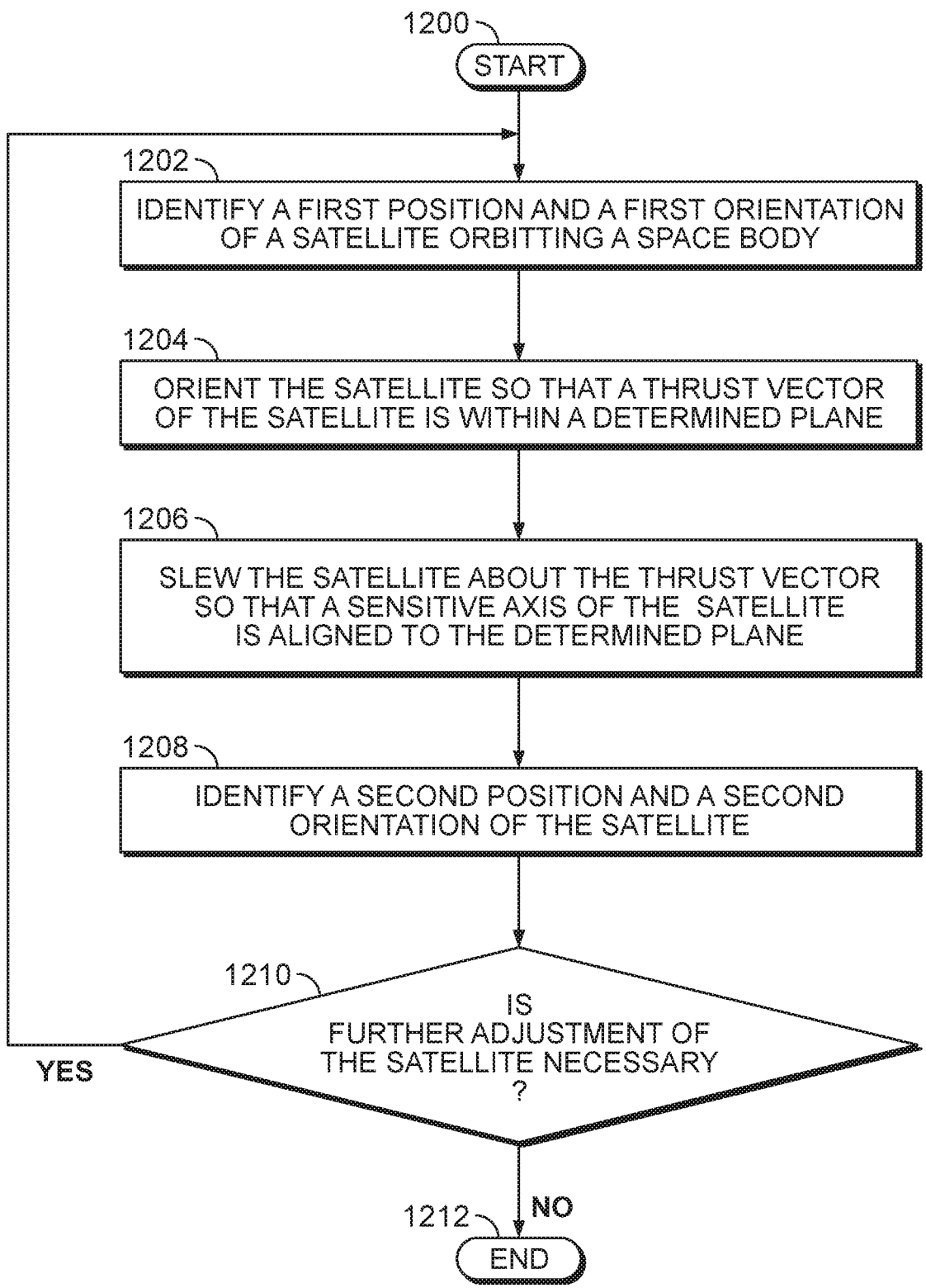
FIG. 12 is a flowchart representative of another example method to implement the examples disclosed herein.
Figure 13:
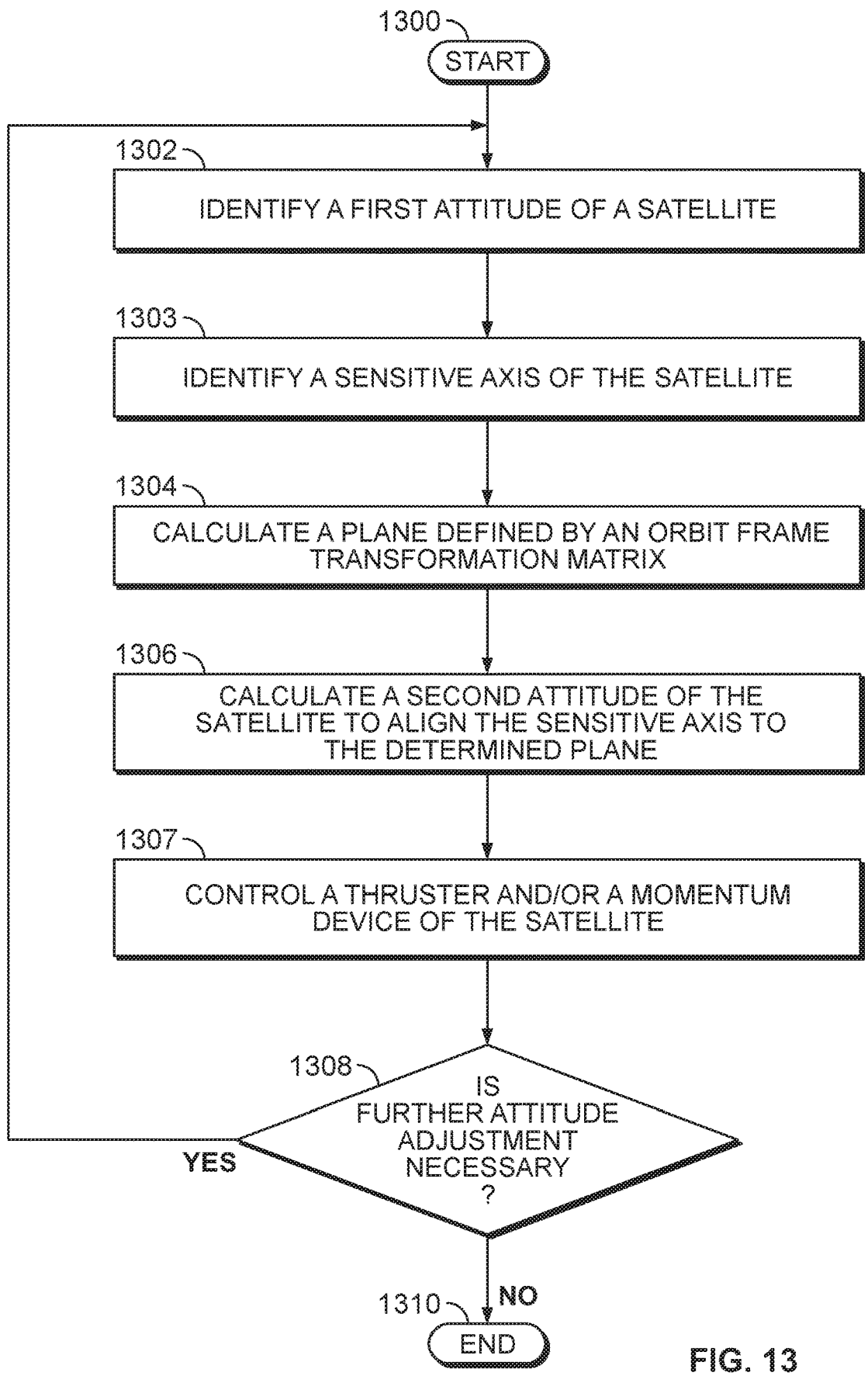
FIG. 13 is a flowchart representative of yet another example method to implement the examples disclosed herein.

Flowcharts representative of example methods for implementing the satellite energy conservation system 1000 of FIG. 10 are shown in FIGS. 11-13. In these examples, the methods may be implemented using machine readable instructions that comprise a program for execution by a processor such as the processor 1412 shown in the example processor platform 1400 discussed below in connection with FIG. 14. The program may be embodied in software stored on a tangible computer readable storage medium such as a CD-ROM, a floppy disk, a hard drive, a digital versatile disk (DVD), a Blu-ray disk, or a memory associated with the processor 1412, but the entire program and/or parts thereof could alternatively be executed by a device other than the processor 1412 and/or embodied in firmware or dedicated hardware. Further, although the example program is described with reference to the flowcharts illustrated in FIGS. 11-13, many other methods of implementing the example satellite energy conservation system 1000 may alternatively be used. For example, the order of execution of the blocks may be changed, and/or some of the blocks described may be changed, eliminated, or combined.

As mentioned above, the example methods of FIGS. 11-13 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example methods of FIGS. 11-13 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The example method of FIG. 11 begins at block 1100 where a satellite such as the satellite 100 is maneuvered and/or oriented to reduce gravity gradient torque(s) acting on the satellite from a space body (e.g., the planet 208) (block 1100). In particular, the satellite is orbiting the space body in an orbit (e.g., a final orbit) and may be about to enter a higher orbit to perform functions (e.g., communications, information gathering, etc.) at the higher orbit.

In the example of FIG. 11, a position and orientation/attitude of the satellite is determined (block 1102). For example, a sensor interface such as the sensor interface 1010 may gather and/or collect sensor data to determine the relative position and attitude of the satellite relative to the space body. In some examples, a predicted velocity and/or attitude of the satellite is determined (e.g., predicted as a function of time) based on current satellite motion conditions and/or relative position of the satellite to the space body.

In some examples, the sensitive axis of the satellite is calculated (block 1104). In particular, the mass/inertia data of the satellite may be used to determine the sensitive axis. In other examples, the principle sensitive axis is pre-defined and/or known based on the design of the satellite. Additionally or alternatively, the sensitive axis is calculated based on updated mass/inertial characteristics that correspond to current conditions of the satellite (e.g., fuel burn, updated conditions of the satellite, etc.).

Next, the satellite of the illustrated example is maneuvered and/or oriented so that a sensitive axis is oriented with a determined orbital frame plane (e.g., the plane 404) or (block 1106). Alternatively, the sensitive axis is oriented with an orbital frame vector (e.g., the vector 402).

In some examples where the satellite is being moved to a different orbit (e.g., an orbital raising), a thrust vector (e.g., the thrust vector 602) of the satellite is oriented perpendicular to the principle sensitive axis (block 1107). In some examples, the thrust vector is oriented perpendicular to the principle sensitive axis simultaneously with the sensitive axis of the satellite being oriented to the orbital frame plane (e.g., during the same maneuver).

In the examples where the satellite is moved to a different orbit, once the satellite has been oriented, a thruster or other movement device of the satellite is operated/activated to alter an orbital altitude of the satellite (block 1108). In some examples, this thruster is simultaneously operated for an orbit raising maneuver as the satellite is being oriented (blocks 1106 and/or 1107) and the process then ends (block 1110). Alternatively, numerous thrusters are activated for a resultant thrust vector that is perpendicular to the principle sensitive axis.

FIG. 12 is a flowchart representative of another example method to implement the examples disclosed herein. In the example method of FIG. 12, a satellite orbiting a space body is undergoing an orbital raising, but has limited thrust maneuvering capabilities and/or limited thruster orientations. The example method of FIG. 12 begins at block 1200 where the satellite is initiating an orbital raising maneuver (block 1200).

A first position and a first orientation/attitude of the satellite is determined (block 1202). Next, the satellite is maneuvered and/or oriented (e.g., slewed) so that a thrust vector of the satellite is within a determined orbital frame plane (e.g., the plane 404) (block 1204). For example, the orbital frame plane may be determined as a function of time by an orientation controller (e.g., the orientation controller 1008) of the example satellite. In this example, the orbital frame plane of the illustrated example is determined as a function of satellite position, which changes over time.

In the example of FIG. 12, the satellite is slewed about the thrust vector (e.g., rotated about the thrust vector) so that a sensitive axis of the satellite is oriented to the determined orbital frame plane (block 1206).

After the satellite has been maneuvered, a second position and a second orientation of the satellite is determined via a sensor interface such as the sensor interface 1010 (block 1208). In some examples, a ground based system of the space body determines the position and orientation of the satellite via a communication system such as the ground communication system 1020, for example.

Next, it is determined whether further adjustment of the satellite is necessary (block 1210). In some examples, this determination is made by analyzing whether continuous attitude adjustment of the satellite is necessary (e.g., during a portion of an orbit) and/or whether the satellite has veered away from a planned trajectory.

If it is determined that further adjustment of the satellite is necessary (block 1210), the process returns control to block 1202. If it is determined that further adjustment of the satellite is not necessary (block 1210), the example process ends (block 1212).

FIG. 13 is a flowchart representative of yet another example method to implement the examples disclosed herein. The example method begins at block 1300 where an example satellite orbiting a space body is in a final orbit (block 1300). However, the satellite is being maneuvered during portions of the orbit to minimize and/or reduce gravity gradient torques encountered at the satellite.

In the example of FIG. 13, a first attitude of the satellite is determined (block 1302). This determination may occur via communication with sensors of a sensor interface (e.g., the sensor interface 1010) and/or ground-based communications (e.g., the communication system 1020).

Next, a sensitive axis (e.g., a principle sensitive axis) of the satellite is determined (block 1303). In some examples, the sensitive axis is calculated based on current satellite conditions (e.g., deployed position, fuel burn, etc.).

In the example of FIG. 13, an orbit frame plane is calculated based on an orbit frame transformation matrix (block 1304). For example, the orbit frame plane may be based on a vector directed from a center of gravity of the satellite to the center of gravity of the space body orbited by the satellite.

In the example of FIG. 13, a second attitude of the satellite is determined/calculated to orient the sensitive axis of the satellite to the orbital frame plane (e.g., the plane 404) (block 1306). For example, an orientation controller such as the orientation controller 1008 may calculate an attitude change (e.g., delta) for the satellite. In some examples, the calculated attitude change may be calculated as a function of time.

Based on the second attitude of the satellite, a thruster and/or momentum device (e.g., a reaction wheel) of the satellite is controlled by a thrust controller such as the thrust controller 1006 to move the satellite to the second attitude (block 1307).

Next, it is determined whether further attitude adjustment of the satellite is necessary (block 1308). If further adjustment of the attitude of the satellite is necessary (block 1308), control of the process returns to block 1302. Alternatively, if further adjustment is not necessary (block 1308), the process ends (block 1310).

Figure 14:
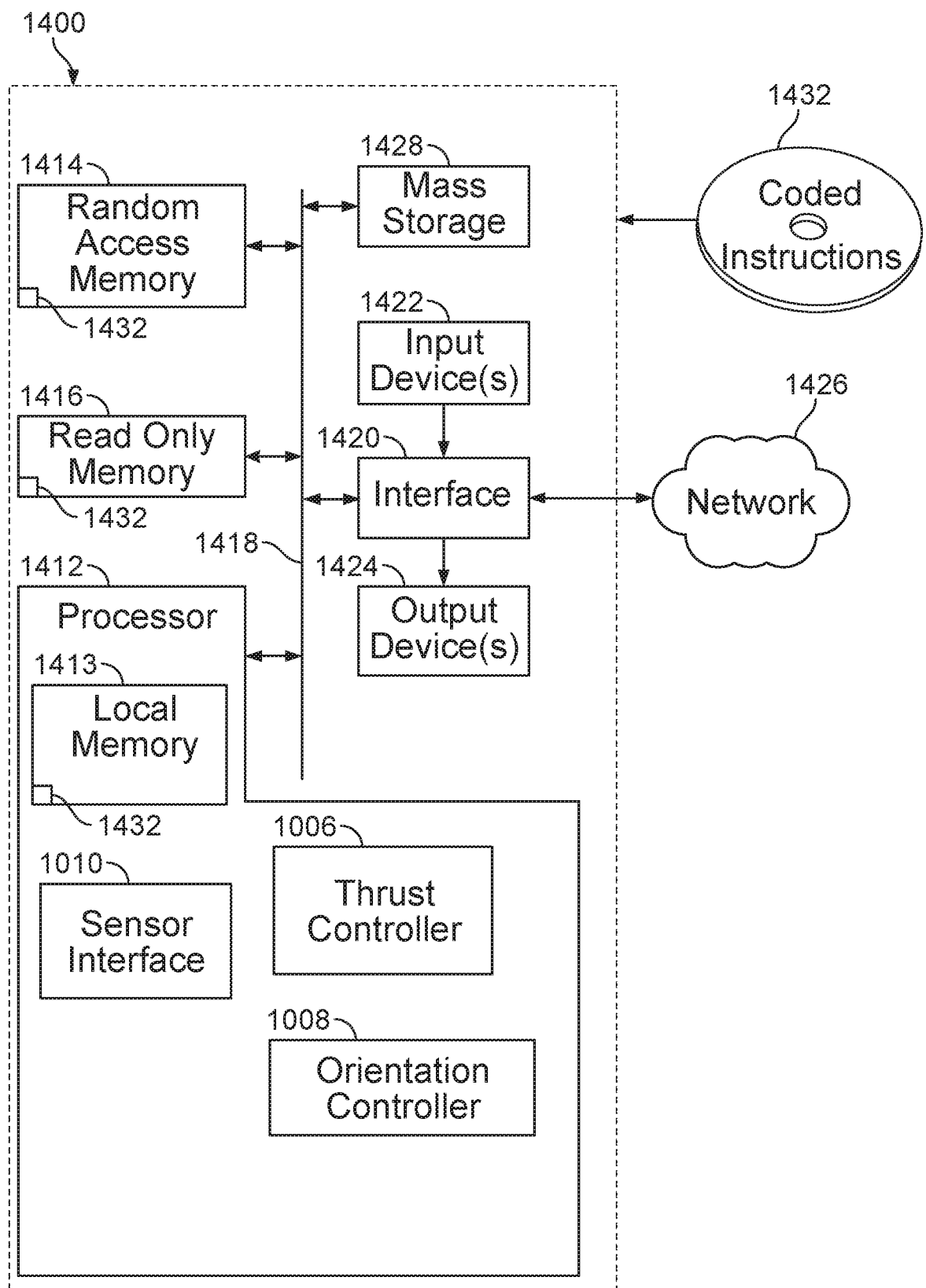
FIG. 14 is a block diagram of an example processor platform capable of executing machine readable instructions to implement the example methods of FIGS. 11-13.

FIG. 14 is a block diagram of an example processor platform 1400 capable of executing the example methods of FIGS. 11-13 to implement the example satellite energy conservation system 1000 of FIG. 10. The processor platform 1400 can be, for example, a server, a personal computer, a mobile device (e.g., a personal digital assistant (PDA), an Internet appliance, or any other type of computing device.

The processor platform 1400 of the illustrated example includes a processor 1412. The processor 1412 of the illustrated example is hardware. For example, the processor 1412 can be implemented by one or more integrated circuits, logic circuits, microprocessors or controllers from any desired family or manufacturer.

The processor 1412 of the illustrated example includes a local memory 1413 (e.g., a cache). The example processor 1412 also includes the thrust controller 1005, the orientation controller 1008 and the sensor interface 1010. The processor 1412 of the illustrated example is in communication with a main memory including a volatile memory 1414 and a non-volatile memory 1416 via a bus 1418. The volatile memory 1414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1416 may be implemented by flash memory and/or any other desired type of memory device. Access to the main memory 1414, 1416 is controlled by a memory controller.

The processor platform 1400 of the illustrated example also includes an interface circuit 1420. The interface circuit 1420 may be implemented by any type of interface standard, such as an Ethernet interface, a universal serial bus (USB), and/or a PCI express interface.

In the illustrated example, one or more input devices 1422 are connected to the interface circuit 1420. The input device(s) 1422 permit(s) a user to enter data and commands into the processor 1412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1424 are also connected to the interface circuit 1420 of the illustrated example. The output devices 1424 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 1420 of the illustrated example, thus, typically includes a graphics driver card, a graphics driver chip or a graphics driver processor.

The interface circuit 1420 of the illustrated example also includes a communication device such as a transmitter, a receiver, a transceiver, a modem and/or network interface card to facilitate exchange of data with external machines (e.g., computing devices of any kind) via a network 1426 (e.g., an Ethernet connection, a digital subscriber line (DSL), a telephone line, coaxial cable, a cellular telephone system, etc.).

The processor platform 1400 of the illustrated example also includes one or more mass storage devices 1428 for storing software and/or data. Examples of such mass storage devices 1428 include floppy disk drives, hard drive disks, compact disk drives, Blu-ray disk drives, RAID systems, and digital versatile disk (DVD) drives.

Coded instructions 1432 to implement the methods of FIGS. 11-3 may be stored in the mass storage device 1428, in the volatile memory 1414, in the non-volatile memory 1416, and/or on a removable tangible computer readable storage medium such as a CD or DVD.

From the foregoing, it will be appreciated that the above disclosed methods and apparatus enable energy efficient operations of satellites/RSOs, thereby allowing more compact and weight-saving satellites/RSOs. The increased compactness and weight savings result in reduced payload requirements for corresponding space launch vehicles.

This patent arises as a continuation of U.S. patent application Ser. No. 16/192,411, which was filed on Nov. 15, 2018 and which claims priority to U.S. patent application Ser. No. 15/728,281, which was filed on Oct. 9, 2017 and which claims priority to U.S. patent application Ser. No. 14/940,811, which was filed on Nov. 13, 2015, now granted as U.S. Pat. No. 10,005,568. The foregoing U.S. patent applications are hereby incorporated herein by reference in their entirety.

Although certain example methods and apparatus have been disclosed herein, the scope of coverage of this patent is not limited thereto. On the contrary, this patent covers all methods, apparatus and articles of manufacture fairly falling within the scope of the claims of this patent. While satellites are described, the example methods and apparatus may be applied to vehicles, aerodynamic structures, etc.

What is claimed is:

1. A satellite comprising:
a maneuvering device; and
an orientation controller to:
calculate a sensitive axis of the satellite, and
cause the maneuvering device to orient a functional vector to be aligned with an orbit frame plane and slew the satellite about the functional vector to orient the sensitive axis of the satellite to the orbit frame plane to reduce gravity gradient torques acting upon the satellite.

2. The satellite as defined in claim 1, wherein the orientation controller causes the maneuvering device to orient the functional vector of the satellite with the orbit frame plane.

3. The satellite as defined in claim 2, wherein the functional vector includes a thrust vector.

4. The satellite as defined in claim 1, wherein the orientation controller calculates the sensitive axis based on at least one of fuel burned or a deployed condition of solar panels of the satellite.

5. The satellite as defined in claim 4, further including a sensor to determine the at least one of the fuel burned or the deployed condition.

6. The satellite as defined in claim 1, wherein the orientation controller causes the thruster to orient a thrust vector of the satellite to be perpendicular to the sensitive axis.

7. A method comprising:
calculating, via instructions executed by a processor, a sensitive axis of a satellite that is in an orbit around a space body; and
controlling a guidance system to maneuver the satellite by aligning a functional vector of the satellite to an orbit frame plane and slewing the satellite about the functional vector so that the sensitive axis is oriented to the orbit frame plane to reduce gravity gradient torques acting upon the satellite.

8. The method as defined in claim 7, wherein maneuvering the satellite includes rotating the satellite about a thrust vector of the satellite.

9. The method as defined in claim 7, further including orienting a thrust vector of the satellite to be perpendicular to the sensitive axis.

10. The method as defined in claim 7, wherein calculating the sensitive axis is based on at least one of fuel burned or a deployed condition of the satellite.

11. The method as defined in claim 10, wherein the deployed condition includes a degree to which solar panels of the satellite are un-folded from the satellite.

12. The method as defined in claim 7, wherein the functional vector includes a thrust vector.

13. A non-transitory machine readable medium having instructions stored thereon, which when executed, cause a processor to:
calculate a sensitive axis of a satellite orbiting a space body based on sensor readings of the satellite, the satellite having an associated functional vector;
determine an orbit frame plane using an orbit frame transformation matrix, wherein the orbit frame plane is perpendicular to an orbit frame vector;
determine an attitude of the satellite to orient the sensitive axis to the determined orbit frame plane, and to orient the functional vector to be aligned with the orbit frame plane; and
direct a guidance system to move the satellite to the attitude.

14. The non-transitory readable medium having instructions stored thereon as defined in claim 13, wherein the instructions further cause the processor to maintain an orbital range of the satellite.

15. The non-transitory readable medium having instructions stored thereon as defined in claim 13, wherein the functional vector includes a thrust vector.

16. The non-transitory readable medium having instructions stored thereon as defined in claim 15, wherein the sensitive axis is calculated based on at least one of fuel burned or a deployed condition of the satellite.

17. The non-transitory readable medium having instructions stored thereon as defined in claim 16, wherein the deployed condition includes a degree to which solar panels are un-folded from the satellite.

* * * * *